UNITED STATES PATENT OFFICE.

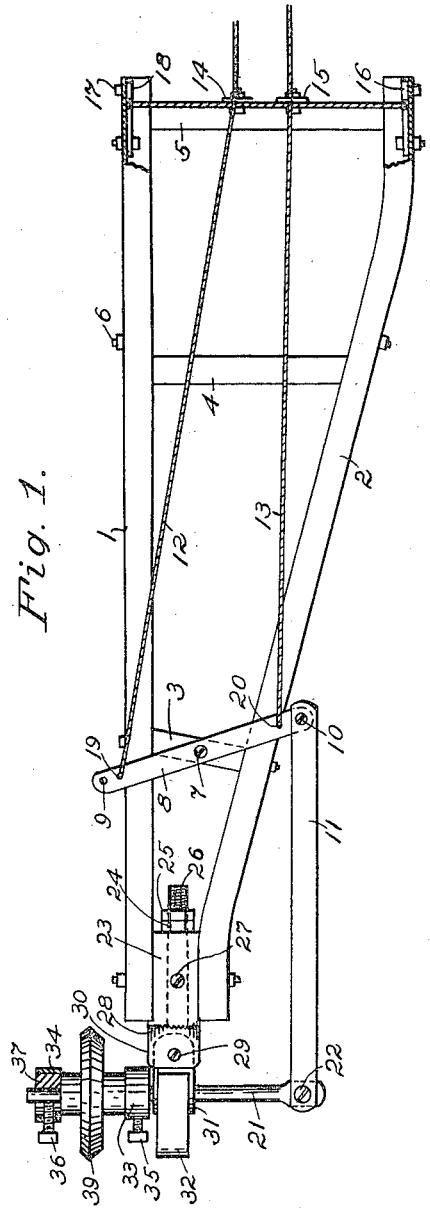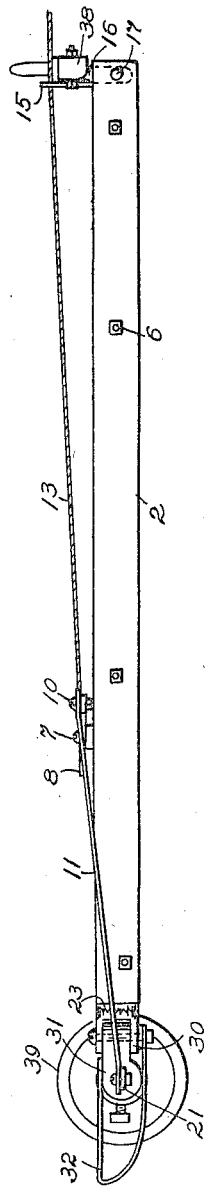

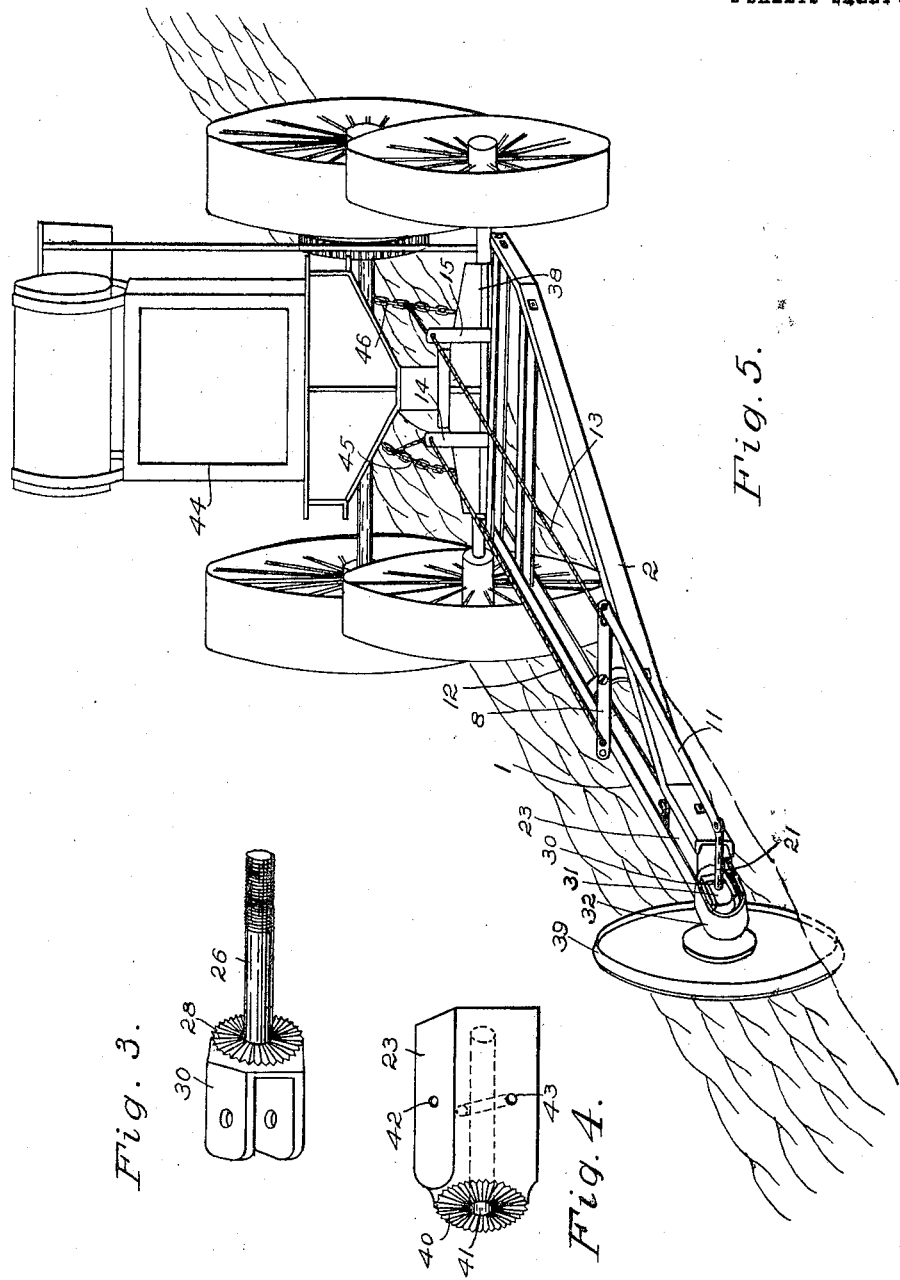

JOHN A. HARNER, OF CEDAR FALLS, IOWA.

AUTOMATIC GUIDING MEANS FOR TRACTORS.

1,064,827.  Specification of Letters Patent.  Patented June 17, 1913.

Application filed May 28, 1912. Serial No. 700,219.

*To all whom it may concern:*

Be it known that I, JOHN A. HARNER, a citizen of the United States of America, and a resident of Cedar Falls, Blackhawk county, Iowa, have invented certain new and useful Improvements in Automatic Guiding Means for Tractors, of which the following is a specification.

My invention relates to improvements in automatic guiding means for tractors and similar vehicles, and the object of my improvement is to furnish a guide-wheel supported by and projected from a tractor on a supporting body, which is adapted to run in a furrow at one side of the tractor, and furnished with connections operative on the pivoted axle of the tractor to automatically guide the latter parallel to the furrow, said wheel having adjustable mountings, adapted to keep it in a proper working position, notwithstanding any warping of the supporting body, and the connections between said guide wheel and the tractor being otherwise improved in fashion and function. This object I have accomplished by the means which are hereinafter described and claimed, and which are illustrated in the accompanying drawings, in which:

Figure 1 is an upper plan view of my improved guiding means, as dissociated from the tractor. Fig. 2 is a side elevation of the parts shown in Fig. 1. Fig. 3 is a perspective detail, enlarged, of the adjustable forked bearing-block supported at the outer end of the framework which is pivoted to the front axle of the tractor. Fig. 4 is a perspective detail, enlarged, of the removable supporting-body at the forward end of said framework which is adapted to adjustably support said forked bearing-block shown in Fig. 3. Fig. 5 is a perspective drawing of a tractor and my automatic guiding means therefor, as in operative position.

Similar numerals of reference denote corresponding parts throughout the several views.

The guide-wheel 39 of my improved device is mounted on a horizontal transverse shaft 21, the latter being fixedly seated in a bearing orifice in a bearing-block 31. The bearing-block 31 is removably mounted for transverse oscillation, on a pivot-pintle 29 connecting the forward forks of a body 30. The wheel 39 is situated to one side of the said bearing-block 31, on the right-hand, so as to run in a furrow opened in the ground to the right-hand side of the tractor 44. The wheel 39 is rotatably mounted on the right-hand portion of the shaft 21 between detachable securing means. These means comprise a pair of rings of cylindrical form, shown at 33 and 34, on opposite sides of the wheel and abutting upon its hub-ends, one-half of the hollow of each ring being filled with a semi-circular block 37, and set-screws 36 and 35 respectively passing through said rings to engage the shaft 21, to hold the said parts firmly together, and secure said wheel between them. The said parts including the body 30 are supported on the outer or forward end of a framework or bracket composed of longitudinal bars 1 and 2 connected rigidly by means of cross-bars 3, 4 and 5, with the bar 1 straight and directed forward longitudinally from the right-hand part of the tractor forward pivoted axle 38, while the other side bar 2 is bent to the right to approach the bar 1 at their forward ends, where for a short distance they are parallel though spaced apart sufficiently to permit of the supporting block 23 being seated removably between them. The supporting body 23 is bolted between said side bars 1 and 2 as stated, and is longitudinally orificed to receive movably a cylindrical projection or shaft 26 of the body 30, the rear end of said shaft projecting to the rear of said body 23 and being threaded exteriorly to receive a pair of lock-nuts 24 and 25.

As best shown in Figs. 3 and 4, the bodies 30 and 23 have their abutting faces provided with counterpart radial corrugations 28 and 40 respectively, which fit together as clamping-means when the projection 26 has been inserted in the orifice 41 of the body 23 and secured by the said lock-nuts. When the nuts are loosened, the projection may be a little shifted longitudinally in said orifice, to permit of the body 30 being adjusted by being more or less rocked on its axis. This adjustment is particularly necessary, to correct deviations of the parts of the framework from the horizontal, due to stresses set up in it while moving over broken or rough ground. The body 30 may thus be adjusted so as to keep the shaft 21 horizontal or parallel to the ground surface, to insure proper running of the wheel 39 in the furrow without binding or breakage or injury to the device generally.

The guide-wheel acts upon the directive apparatus of the tractor 44 automatically by the following operative connecting-means. To the left-hand end of the fixed shaft 21 a link 11 is pivoted by means of a removable pintle 22. The rear end of said link or connecting-rod 11 is pivoted to the left-hand end of a cross-bar 8 on a pintle 10, the latter being also removable. The cross-bar 8 is medially pivoted removably to the fixed cross-bar 3 of said framework by means of a pintle 7. Orifices 19 and 20 are pierced in the ends of the bar 8 equidistantly from the pivot 7 and the forward ends of the cables 12 and 13 are connected to the bar therein. The bar 8 is so proportioned and mounted that it may be removed and reversed in order to permit of a crossing of the cables 12 and 13 when desired or necessary for use in connection with certain types of tractors. To prevent any working loose of the body 30 a set-screw 27 may be inserted through an orifice 42 in said body to engage the projection 26.

The numeral 32 denotes a shoe whose lower rear extremity is secured to the forked block 30 by the bolt 29. The forward part of said shoe is bent upwardly and then rearwardly and lies loosely upon the top of the pivoted part 31. This shoe, being in front of said block 31 and covering it, acts to keep obstructions away therefrom, and is adapted to ride upon and over lumps of sod and other projecting masses met with in the forward progress of the machine to lift the front end of the device clear therefrom and thus prevent damage thereto or a deflection in direction to the guide-wheel.

The cross-bars 3, 4 and 5 are rigidly secured to the side-bars 1 and 2 by means of bolts 6, and the rear ends of said side-bars are pivotally mounted on pintles 17 projected from hangers 16 and 18, the latter fixed to the end parts of the medially pivoted forward axle 38 of said tractor. Near the middle of the rear cross-bar 5, but spaced apart, are the uprights 14 and 15 secured thereto rigidly, and orifices are provided in the upper ends of these uprights to permit the passage of the cables 12 and 13 respectively, the rear ends of said cables then being secured to the chains 45 and 46 which are connected between the ends of said axle and some directive means of control, such as a hand-wheel and its shaft not shown.

The device is operative as follows: The operator of the tractor 44 first drives the tractor across a tract of ground to form a guide furrow, using his directive hand-wheel which acts on the chains 45 and 46 to rock the axle as desired. When the furrow is completed, the return trip is made with the guide-wheel 39 in the newly opened furrow to the right-hand of the machine. It is obvious that the operator may now release the hand-wheel and allow the tractor to drive ahead, since the wheel 39 will follow the guide furrow in its course, rocking the shaft 21 and moving the parts 11, and 8 to cause the cables 12 and 13 to exercise a draft upon the axle 38 to turn it on its pivot appropriately to direct the tractor automatically alongside the furrow to the end of the latter.

Having described my invention, what I claim as new, and desire to secure by Letters Patent, is:

1. Automatic guiding means for a tractor, comprising a supporting bracket pivotally connected to the pivotal axle of a tractor for vertical oscillations, a body seated adjustably in the outer end of said bracket for transverse adjustment relative thereto, means for securing said body in an adjusted position, a bearing block pivoted in said adjustable body for horizontal oscillations, a shaft fixed in said bearing-block transversely to said bracket, a guide-wheel rotatably mounted on one end of said shaft, and operative connections between the other end of said shaft and the ends of said axle adapted to rock said axle when said wheel is rocked.

2. Automatic guiding means for a tractor, comprising a supporting bracket pivotally connected to the pivotal axle of a tractor for vertical oscillations, a body seated removably and adjustably in the outer end of said bracket and adapted to be rocked on a horizontal axis longitudinal to said bracket, means for securing said body in an adjusted position to said bracket, a bearing pivoted to said body for horizontal oscillations, a shaft fixed in said bearing transversely to said bracket, a guide-wheel rotatably mounted on one end of said shaft, a detachable shoe secured longitudinally about said oscillatory bearing, and operative connections between the other end of said shaft and said axle adapted to rock said axle in the same direction as the said shaft is rocked.

3. Automatic guiding means for a tractor, comprising a supporting bracket connected pivotally to the ends of the pivotal axle of a tractor for vertical oscillations, a body adjustably seated in the other end of said bracket and adapted to be turned on its horizontal axis, means for securing said body to said bracket in an adjusted position, a bearing-block pivotally connected to said adjustable body for horizontal oscillations, a shaft fixed transversely in said bearing block, a guide-wheel rotatably mounted on one end of said shaft, a cross-bar medially pivoted to said bracket, a link pivotally connected between one end of said cross-bar and the end of said shaft opposite to said guide-wheel, and cables connected between the ends of said cross-bar and the directive means of the tractor which are secured to the ends of said axle on the same sides.

4. Automatic guiding means for a tractor, comprising a supporting bracket pivotally connected to the pivotal axle of a tractor for vertical oscillations, a body removably seated in the outer end of said bracket and provided with clamping means on its forward face, another body having similar clamping-means on its face abutting upon the said forward face of the first-mentioned body and secured to the latter for adjustment on a longitudinal axis relative thereto and to said bracket, a bearing-block pivotally connected to said second-mentioned body for horizontal oscillations, a shaft fixed in said bearing block, a guide-wheel rotatably mounted on one end of said shaft, and operative connections between the opposite end of said shaft and the ends of said axle adapted to rock the latter in the same direction as said shaft is rocked by the movement transversely of said guide-wheel.

5. Automatic guiding means for a tractor, comprising a supporting bracket composed of rigidly connected spaced apart longitudinal bars converging toward their forward ends to one side and having their rear ends pivotally connected to the pivotal axle of a tractor for vertical oscillations, a body removably seated between the forward spaced-apart ends of said longitudinal bars and having a plurality of engaging-means on its forward face, another body alined longitudinally with and pivoted to said first mentioned body for rocking adjustment relative thereto on a longitudinal axis, means for securing said bodies together with a desired adjustment of the second-mentioned body relative to the first, a bearing-block pivoted to the second mentioned body for horizontal oscillations, a shaft fixed in said bearing-block, a guide-wheel rotatably mounted on one end of said shaft, and operative connections between the other end of said shaft and the ends of said axle adapted to rock the axle when the shaft is rocked.

6. Automatic guiding means for a tractor, comprising a supporting bracket connected pivotally to the pivotal axle of a tractor for vertical oscillations, a body removably seated in the outer end of said bracket and having a radially dentated forward face, a second-body longitudinally alined with the first body and pivotally connected thereto on an axis longitudinal with said bracket, and having its abutting face provided with like radial dentations and adapted to adjustably fit the dentations on the first-mentioned body, means for securing the second- to the first-mentioned body in a desired amount of adjustment of the former, a bearing-block pivotally connected to the second-mentioned body for horizontal oscillations, a shaft fixed in said bearing-block transversely to said bracket, a guide-wheel rotatably mounted on one end of said shaft, and operative connections between the opposite end of said shaft and the ends of said axle, adapted to transmit motion from the shaft to the axle to rock them consonantly together when the said guide-wheel is shifted from side to side.

7. Automatic guiding means for a tractor, comprising a supporting bracket connected pivotally to the pivotal axle of a tractor for vertical oscillations, a body removably seated in the outer end of the bracket and having a radially-dentated forward face, a second body longitudinally alined with the first body and pivotally connected thereto on a longitudinal axis for rocking adjustment to either side, and having its abutting face provided with like dentations to fit those on the other body, means for securing said bodies together adjustably, a bearing-block pivotally connected to the second-mentioned body for horizontal oscillations, a shaft fixed in said bearing block transversely to said bracket, a guide-wheel rotatably mounted on one end of said shaft, a cross-bar medially pivoted to said bracket, a link pivotally connected between the end of said shaft opposite to said guide-wheel and to one end of said pivotal cross-bar, and cables connecting the ends of said cross-bar with the direction-controlling means of the tractor which are operatively connected to the ends of said pivoted axle.

Signed at Waterloo, Iowa, this 10th day of May, 1912.

JOHN A. HARNER.

Witnesses:
W. H. BRUNN,
GEO. C. KENNEDY.

---

Copies of this patent may be obtained for five cents each, by addressing the "Commissioner of Patents, Washington, D. C."